United States Patent
Yamada

[11] Patent Number: 5,762,454
[45] Date of Patent: Jun. 9, 1998

[54] SPINDLE DEVICE

[75] Inventor: Shigeru Yamada, Takaoka, Japan

[73] Assignee: Kitamura Machinery Co. Ltd., Japan

[21] Appl. No.: 688,875

[22] Filed: Jul. 31, 1996

[30] Foreign Application Priority Data

Aug. 11, 1995 [JP] Japan .................. 7-226081

[51] Int. Cl.⁶ .............. B23C 9/00; B23B 49/00; B23Q 11/00
[52] U.S. Cl. .............. 409/194; 408/6; 409/134; 409/232; 483/10
[58] Field of Search .............. 483/1, 10, 8, 7; 409/232, 234, 136, 134, 194, 131, 135; 408/6, 16, 10

[56] References Cited

U.S. PATENT DOCUMENTS

| | | | |
|---|---|---|---|
| 4,127,279 | 11/1978 | Wright | 409/232 X |
| 4,504,824 | 3/1985 | Mello | 408/6 X |
| 4,664,571 | 5/1987 | Takada et al. | 409/134 |
| 4,840,520 | 6/1989 | Pfalzgraf | 409/232 |
| 4,864,714 | 9/1989 | Von Haas et al. | 483/1 |
| 5,002,442 | 3/1991 | Rütschle | 409/134 |

FOREIGN PATENT DOCUMENTS

| | | |
|---|---|---|
| 6-155224 | 6/1994 | Japan . |
| 6-170690 | 6/1994 | Japan . |

*Primary Examiner*—William R. Briggs
*Attorney, Agent, or Firm*—Ronald P. Kananen

[57] ABSTRACT

A spindle device for detecting the completion of an automatic tool changing procedure comprising a spindle (11) having a tool holder support portion (22) formed at the forward end thereof, a drawing bolt (17) with a through-hole (18) through which an air is blown in the vicinity of a tool holder support portion (22) of the spindle (11) for cleaning in the automatic tool changing procedure, and a pressure detection means (21) disposed in association with the through-hole (18) of the drawing bolt (17), wherein whether or not a tool holder (9) is suitably mounted on the tool holder mounting portion (22) is judged on the basis of an air blow pressure detected by the pressure detection means (21).

7 Claims, 2 Drawing Sheets

SPINDLE DEVICE

BACKGROUND OF THE INVENTION

This invention relates to a spindle device for detecting the completion of an automatic tool changing procedure.

Generally, the machining center is provided with a tool magazine for stocking a plurality of tool holders and an automatic tool changing arm for exchanging an old tool holder with a new tool holder in an automatic tool changing procedure (ATC step).

In an ATC step, a predetermined tool holder is transferred to a support portion of a spindle by the ATC arm. In this step, if the spindle starts to rotate before the tool holder is completely seated on the supporting portion of the spindle, there is a great possibility that the tapered supporting portion of the spindle and the corresponding surface of the tool holder tend to be damaged.

On that account, the stroke end of the ATC arm has been detected by means of a limit switch or a proximity switch, etc in the conventional spindle device.

However, it is considered that the detection of the stroke end of the ATC arm is sometimes troubled due to any deviation of timing. Once the tool holder supporting portion of the spindle or the corresponding surface of the tool holder has been damaged as a result of an incorrect mounting, an accuracy of machining considerably deteriorates. Therefore, a highly reliable checking system has been desired.

On the other hand, there has been proposed and widely used such a spindle device that a through-hole is provided in a drawing bolt for supplying an air or a coolant therethrough. In the spindle device of this type, there is the same trouble as described before.

In view of the above-said problem in prior art, it is an object of the present invention to provide a spindle device for accurately detecting the completion of the automatic tool changing procedure, thereby free from mounting errors.

SUMMARY OF THE INVENTION

According to this invention a spindle device for detecting the completion of an automatic tool changing procedure comprises a spindle having a tool holder supporting portion formed at the forward end thereof, a drawing bolt having a through-hole through which an air is blown in the vicinity of the tool holder support portion of the spindle for cleaning in the automatic tool changing procedure, and a pressure detection means disposed in association with the through-hole of the drawing bolt, wherein whether or not a tool holder is suitably mounted on the tool holder mounting portion is judged on the basis of an air blow pressure detected by the pressure detection means.

The through-hole of the drawing bolt is preferably located on the axis thereof.

The pressure detection means is preferably a pressure gage.

The pressure detection means is connected directely or indirectly to the through-hole of the drawing bolt. The pressure detection means can be disposed to an air supply pipe connected to the through-hole of the drawing bolt.

According to the invention, whether or not the tool holder is suitably mounted on the tool holder support portion of the spindle can be judged on the basis of a sharp change of the air blow pressure detected by the pressure detection means.

A coolant can be supplied through the through-hole for cooling and lubricating purposes in a machining step.

According to the spindle device of this invention, whether or not a tool holder is suitably mounted on the support portion of the spindle is judged on the bases of an air blow pressure so that the end of an ATC procedure can be accurately judged without errors.

DESCRIPTION OF THE PREFERRED EMBODIMENT

Figure 1:
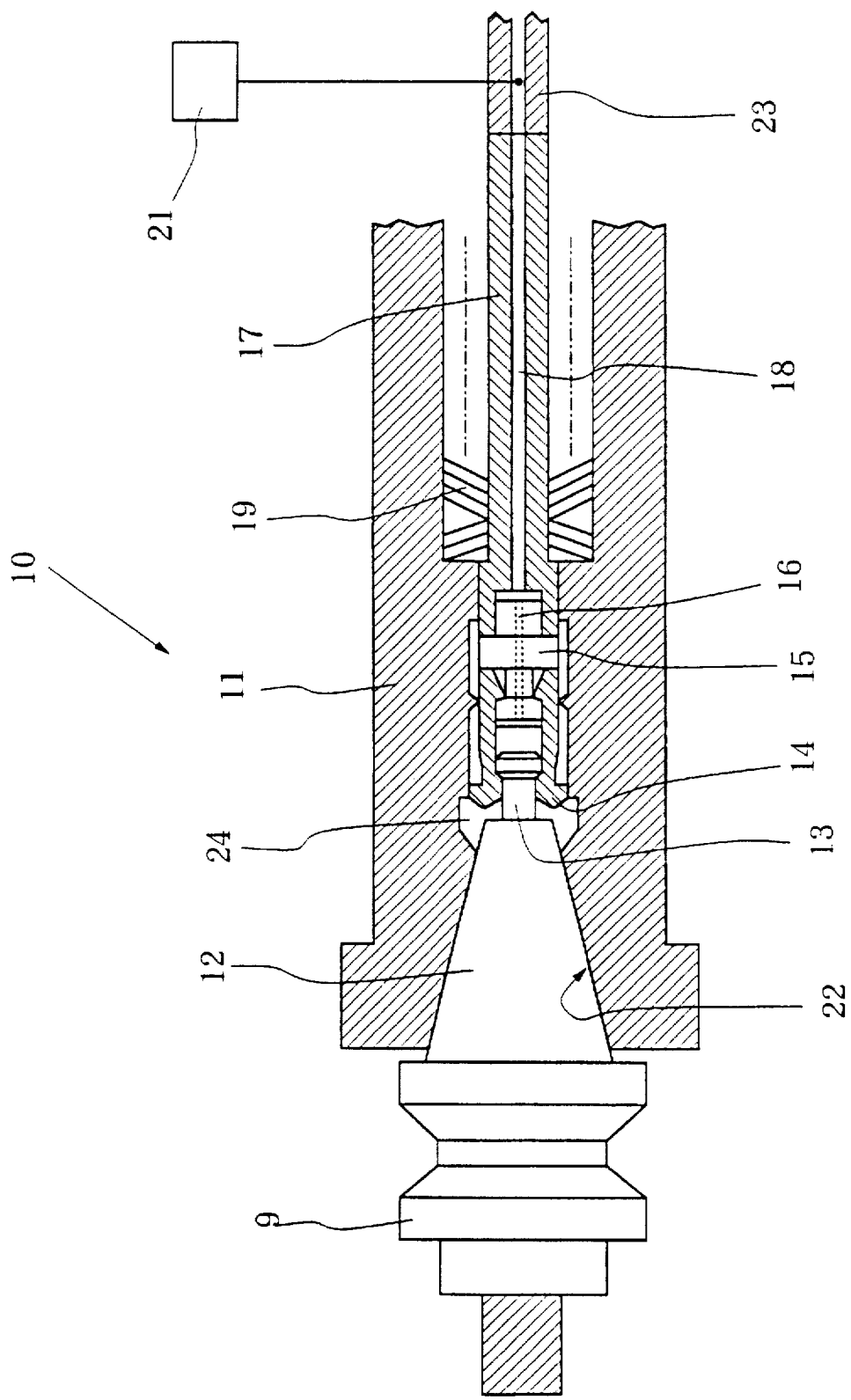
FIG. 1 is a sectional view showing a main part of a spindle device according to an embodiment of the present invention.

An embodiment of the present invention will be described hereinafter with reference to the drawings. FIG. 1 is a sectional view showing a main part of a spindle device according to the present invention.

The spindle device 10 of the present invention is characterized in that the pressure of an air blow is detected in an automatic tool changing procedure for judging whether or not a tool holder is suitably seated on the supporting portion of a spindle. Other constitutions of the spindle device is not fully described, on which the customary constitutions of the conventional spindle device can be applied without modification.

The spindle device 10 is provided with a spindle 11 which can be rotated at a high speed. The spindle 11 is supported by bearings and is driven by drive means such as a motor.

The spindle 11 has a through-hole on its axis. The spindle 11 is formed at the forward end with a tapered support portion 22 for supporting a tool holder 9. The shape of the tapered support portion 22 is corresponding to that of a mounting portion 12 of the tool holder 9. The tool holder support portion 22 has an escape portion 24 at the lower end thereof for receiving a collet chuck 14.

A drawing bolt 17 is slidably inserted into the through-hole. A plurality of plate springs 19 are arranged on the periphery of the drawing bolt 17. The plate springs 19 urge the drawing bolt 17 rearward.

The drawing bolt 17 has a passage 18 on its axis. This through-hole 18 is used for supplying an air blow, whereas it can be also used as a supply passage for a coolant.

To the forward end of the drawing bolt 17 is connected an inner sleeve 15 which is tubular as a whole but has a large diameter intermediate portion. The inner sleeve 15 is formed on its center axis with a through-hole 16. The through-hole 16 of the inner sleeve 15 is connected to the through-hole 18 of the drawing bolt 17.

At the forward end of the inner sleeve 15 is set a collet chuck 14 for gripping a pull stud 13 of the tool holder 12. The front portion of the collet chuck 14 is divided into four sections by clearances arranged at regular intervals in a circumferential direction so that when the end portion of the collet chuck 14 moves into the escape portion 24, it can slightly open to release the pull stud 13 of the tool holder 12.

At the rear of the drawing bolt 17 is provided an pushing mechanism (not shown) for pushing forward the drawing bolt 17 against the forces of the plate springs 19. In an ATC procedure, the pushing mechanism is operated in the predetermined manner cooperating with a tool exchange arm (not shown).

An air supply pipe 23 is connected to the rear end of the drawing bolt 17. The air supply pipe 23 is connected to the though-hole 18 of the drawing bolt 17.

A pressure detection means 21, for example a pressure gage 21, is provided in association with the through-hole 18 of the drawing bolt 17. In this embodiment the pressure gage 21 is disposed to the air supply pipe 23. The pressure detection means 21 can be arranged directly in the through-hole 18 so as to sense air blow pressure.

Next, the operation of this embodiment will be described with reference to FIG. 2 also.

Figure 2:
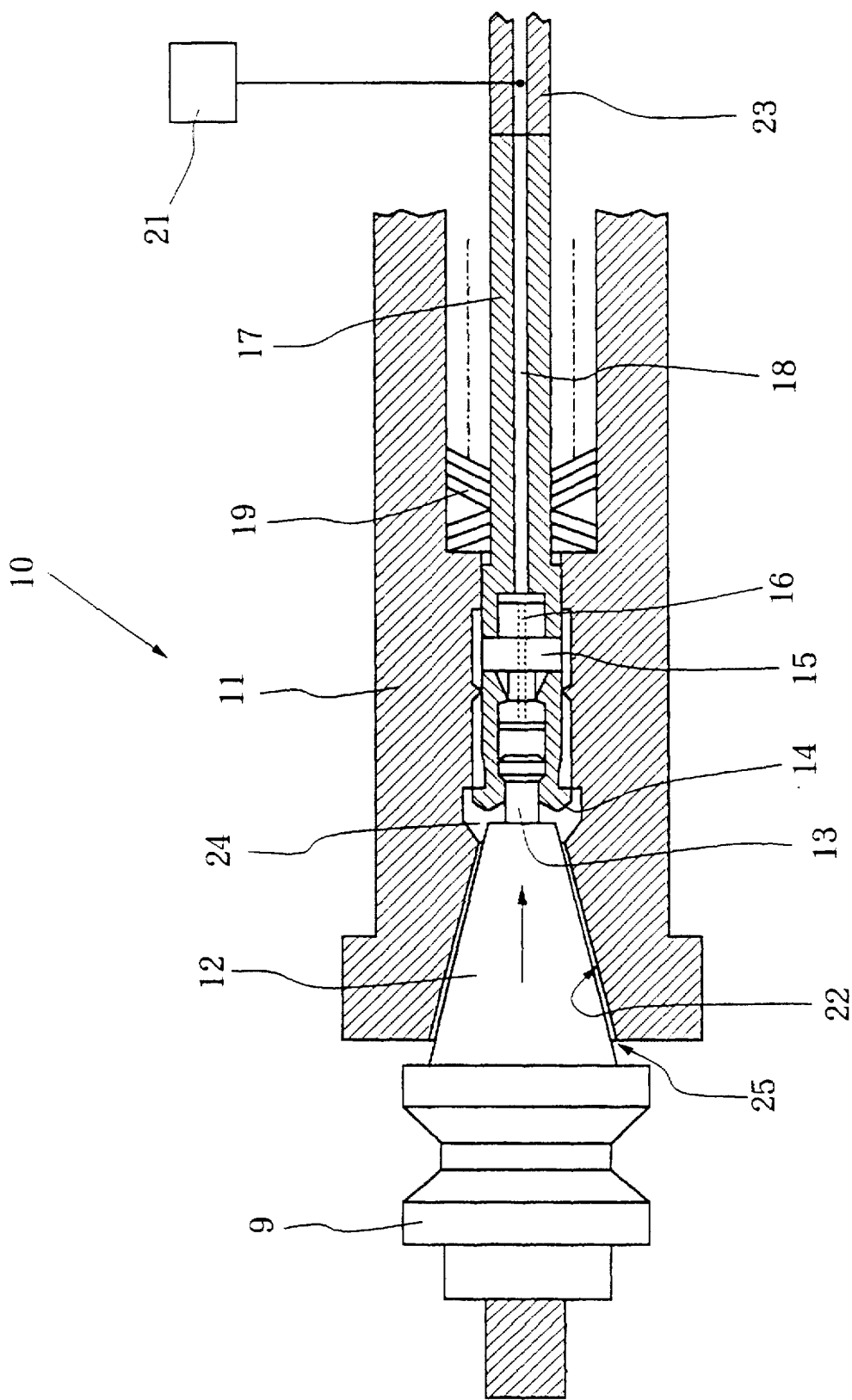
FIG. 2 is a similar sectional view to FIG. 1, showing the state immediately before the tool holder is completely mounted.

FIG. 2 shows, the state immediately before the tool holder 9 is completely set on the spindle 11 in automatic tool change.

In the automatic tool change procedure an air blow is supplied to the vicinity of the tool holder support portion 22 via the air supply pipe 23 and the through-hole of the drawing bolt 17. By the air blow, the support portion 22 and the corresponding surface of the tool holder 9 are maintained clean.

The state shown in FIG. 2 is immediately before the completion of an automatic tool changing procedure (in other words, an incomplete setting state), wherein if the spindle starts to rotate by malfunction, troubles are easily caused as previously mentioned in the prior art.

Since in this state there is a clearance 25 present between the surface of the tool holder 9 and the tool holder support portion 22 of the spindle 11, the pressure of air blow exerted via the through-hole 18 of the drawing bolt 17 does not indicate a so sharp change.

Then the setting of the tool holder is completed as shown in FIG. 1, the tool holder surface comes in close contact with the tool holder support portion 22 of the spindle 11 so that the clearance 25 shown in FIG. 2 disappears.

At that moment, the air blow pressure indicates a very sharp change. Accordingly, when the air blow pressure shows rapid increase, such judgement is made that the tool change has been completed.

Of course, as the clearance 25 in FIG. 2 becomes small, the pressure within the through-hole 18 increases but the pressure at the moment when the clearance 25 disappears should indicate an extremely sharp change. Accordingly, the completion of a tool holder changing (setting) procedure can be detected accurately without errors.

As described above, by detecting the air blow pressure, it is possible to judge accurately without errors whether or not a tool holder is suitably mounted on the tool holder support portion.

It is to be noted that the present invention is not limited to the above-mentioned embodiment. For example, the spindle device of the present invention can be also applied to the spindle device disclosed in Japanese Patent Laid-Open No. 6-155224 or No. 6-170690. In this case, a supply channel is preferably switched over with a slight time difference between air and a coolant by means of a valve means.

I claim:

1. A spindle device comprising:

a spindle (11) having a through-hole extending in an axial direction, a forward end positioned at one end of said through-hole of said spindle (11), and a tool holder support portion (22) having an escape portion (24) and a tapered shape, formed at said forward end thereof;

a tool holder (9) for holding a tool, said tool holder (9) having a pull stud (13) and a mounting portion (12), said mounting portion having a tapered shape which corresponds to said tapered shape of said tool holder support portion (22) of said spindle (11);

a collet chuck (14) for gripping said pull stud (13) of said tool holder (9);

a drawing bolt (17) positioned in said through-hole of said spindle (11) such that said drawing bolt (17) is adapted to slidably move in said axial direction, said drawing bolt (17) having a through hole (18) through which an air is blown onto said tool holder support portion (22) of said spindle (11) for the cleaning function in an automatic tool changing procedure wherein said air flows via said through-hole of said drawing bolt (17) and said escape portion (24) of said tool holder support portion (22) of said spindle (11) into a space between said tool holder support portion (22) of said spindle (11) and said mounting portion (12) of said tool holder (9) only if said tool holder (9) is suitably mounted on said tool holder support portion (22) of said spindle (11), and wherein said collet chuck (14) has an end portion which moves into said escape portion (24) of said spindle (11) and then partially opens such that said pull stud (13) of said tool holder (12) is released when said drawing bolt (17) moves in said axial direction; and a pressure detection means (21) disposed in association with said through-hole (18) of said drawing bolt (17), wherein whether or not said tool holder (9) is suitably mounted on said tool holder support portion (22) is judged in response to an air blow pressure detected by said pressure detection means (21).

2. A spindle device according to claim 1, said through-hole (18) of said drawing bolt (17) having a rearward end connected via an air supply pipe (23) to said through-hole (18) of said drawing bolt (17).

3. A spindle device according to claim 2, wherein said pressure detection means (21) is a pressure gage (21).

4. A spindle device according to claim 1, wherein said pressure detection means (21) is a pressure gage (21) connected directly to said through-hole (18) of said drawing bolt (17).

5. A spindle device according to claim 1, wherein said pressure detection means (21) is connected to an air supply pipe connected to the through-hole (18) of said drawing bolt (17).

6. A spindle device according to claim 1, wherein when said pressure detecting means (21) detects a sharp change of said air blow pressure determines whether or not said tool holder is suitably mounted.

7. A spindle device according to claim 1, wherein a coolant is supplied through said through-hole (18) of said drawing bolt (17) in a machining step.

* * * * *